(12) United States Patent
Zhang et al.

(10) Patent No.: US 12,439,453 B2
(45) Date of Patent: Oct. 7, 2025

(54) METHOD AND APPARATUS FOR MULTIPLE UPLINK TRANSMISSIONS

(71) Applicant: Lenovo (Beijing) Limited, Beijing (CN)

(72) Inventors: Yu Zhang, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 378 days.

(21) Appl. No.: 18/246,646

(22) PCT Filed: Sep. 28, 2020

(86) PCT No.: PCT/CN2020/118425
§ 371 (c)(1),
(2) Date: Mar. 24, 2023

(87) PCT Pub. No.: WO2022/061896
PCT Pub. Date: Mar. 31, 2022

(65) Prior Publication Data
US 2023/0397250 A1 Dec. 7, 2023

(51) Int. Cl.
*H04W 74/0808* (2024.01)
*H04W 72/044* (2023.01)

(52) U.S. Cl.
CPC .............................. *H04W 74/0808* (2013.01)

(58) Field of Classification Search
CPC .................... H04W 74/0808; H04W 72/046
See application file for complete search history.

(56) References Cited

U.S. PATENT DOCUMENTS

| | | | | |
|---|---|---|---|---|
| 2019/0090223 | A1* | 3/2019 | Nam | H04L 5/0053 |
| 2019/0116605 | A1* | 4/2019 | Luo | H04B 7/06952 |
| 2020/0154474 | A1* | 5/2020 | Lo | H04W 74/0808 |
| 2020/0288453 | A1* | 9/2020 | Zhang | H04W 72/12 |

FOREIGN PATENT DOCUMENTS

| | | |
|---|---|---|
| CN | 110149720 A | 8/2019 |
| CN | 111095817 A | 5/2020 |
| WO | 2020146272 A1 | 7/2020 |

OTHER PUBLICATIONS

3GPP TSG RAN WG1 Meeting #92bis R1-1804885 (Year: 2018).*
Interdigital Inc. , "On LBT for Beam-Based Transmission for NR-U", 3GPP TSG RAN WG1 Meeting #92bis, R1-1804885, Sanya, China [retrieved Jan. 29, 2023]. Retrieved from the Internet <https://www.3gpp.org/ftp/tsg_ran/WG1_RL1/TSGR1_92b/Docs?sortby=sizerev>., Apr. 2018, 6 Pages.
PCT/CN2020/118425 , "International Preliminary Report on Patentability", PCT Application No. PCT/CN2020/118425, Apr. 6, 2023, 5 pages.
PCT/CN2020/118425 , "International Search Report and Written Opinion", PCT Application No. PCT/CN2020/118425, Jul. 2, 2021, 6 pages.

* cited by examiner

*Primary Examiner* — Harry H Kim
(74) *Attorney, Agent, or Firm* — FIG. 1 Patents

(57) ABSTRACT

The present application relates to a method and an apparatus for multiple uplink transmissions. The method includes: receiving a first control information for a first uplink transmission; receiving a second control information for a second uplink transmission; and determining a beam for transmitting the first uplink transmission, wherein the beam is indicated in the first control information or indicated in the second control information.

16 Claims, 14 Drawing Sheets

METHOD AND APPARATUS FOR MULTIPLE UPLINK TRANSMISSIONS

TECHNICAL FIELD

Embodiments of the present application generally relate to wireless communication technology, especially to a method and an apparatus for multiple uplink transmissions under 3GPP (3rd Generation Partnership Project) 5G New Radio (NR).

BACKGROUND

For network of 3rd Generation Partnership Project (3GPP) 5G New Radio (NR), technologies of transmission on unlicensed spectrum are developed. When unlicensed spectrum is used for transmission, channel access procedure (i.e., Listen-Before-Talk procedure, LBT procedure) is required. To improve the probability of successful channel access and to enhance the spatial reuse, directional LBT procedure, which is executed based on performing energy detection via narrow beam, is introduced. However, there are still some issues that need to be solved when performing directional LBT procedure.

LBT procedure is executed based on performing energy detection on a certain channel. Only when LBT procedure generates a success result, the transmitter can start the transmission on the channel and occupy the channel up to a maximum channel occupancy time (MCOT); otherwise, the transmitter cannot start the transmission and continue performing LBT procedure until the LBT procedure generates a success result. There are multiple categories of LBT procedures, for example LBT-Cat. 1, LBT-Cat. 2, LBT-Cat. 3 and LBT-Cat. 4. LBT-Cat. 2 means that LBT procedures are performed without random back-off, and the duration of time that the channel is sensed to be idle before the transmitter transmits is deterministic. LBT-Cat. 4 means that LBT procedures are performed with random back-off with a variable contention window size.

SUMMARY

Some embodiments of the present application provide a method for a user equipment. The method includes: receiving a first control information for a first uplink transmission; receiving a second control information for a second uplink transmission; and determining a beam for transmitting the first uplink transmission, wherein the beam is indicated in the first control information or indicated in the second control information.

Some embodiments of the present application provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), etc. It is contemplated that along with the 3GPP and related communication technology development, the terminologies recited in the present application may change, which should not affect the principle of the present application.

Figure 1:
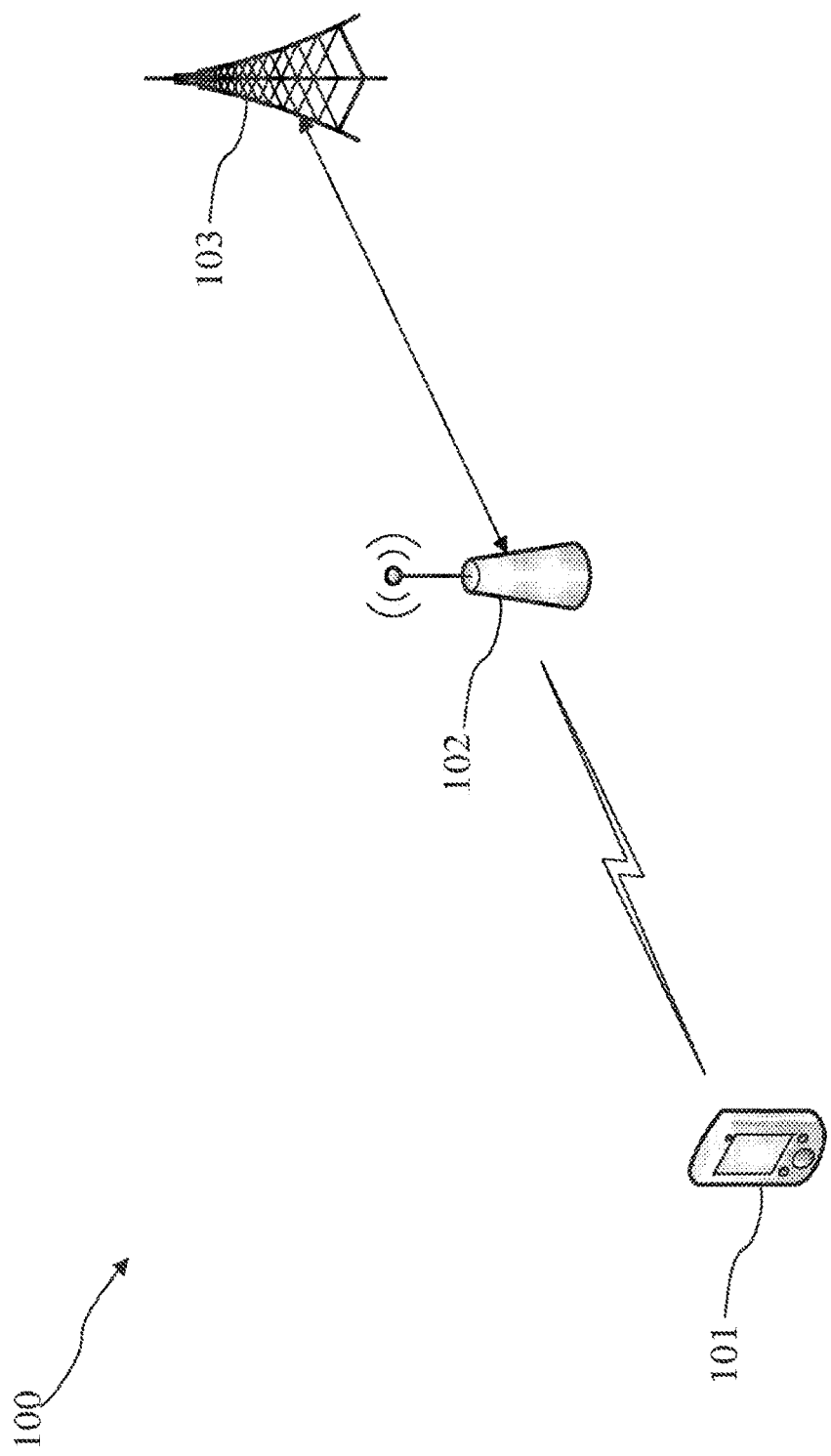
FIG. 1 illustrates a schematic diagram of a wireless communication system in accordance with some embodiments of the present application.

Referring to FIG. 1, a wireless communication system 100 may include a user equipment (UE) 101, a base station (BS) 102 and a core network (CN) 103. Although a specific number of the UE 101, the BS 102 and the CN 103 are depicted in FIG. 1, it is contemplated that any number of the UEs 101, the BSs 102 and the CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which communicatively coupled with the AMF entity.

The BS 102 may be distributed over a geographic region. In certain embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with the BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the NR-light of the 3GPP protocol, wherein the BS 102 transmits data using an OFDM modulation scheme on the downlink (DL) and the UE 101 transmits data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the UE 101 and BS 102 may communicate using other communication protocols, such as the IEEE 802.11 family of wireless communication protocols. Further, in some embodiments of the present application, the UE 101 and BS 102 may communicate over licensed spectrums, whereas in other embodiments, the UE 101 and BS 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

According to some existed agreements, the UE 101 and the BS 102 included in the wireless communication system 100 may be compatible with New Radio operating on Unlicensed spectrum (NR-U) of the 3GPP protocol. To improve the probability of successful channel access and to enhance the spatial reuse, directional Listen-Before-Talk (LBT) procedure, which performs energy detection via narrow beam, may be introduced. However, according to the current agreements, there are still some issues that need to be solved when performing directional LBT procedure.

Particularly, some issues may be related to determining a beam for the UE 101 to transmit uplink transmission. For example, assuming that: (a) the UE 101 is going to transmit two uplink transmissions without a gap; (b) beam 'A' is indicated for transmitting uplink transmission 'a'; and (c) beam 'B' is indicated for transmitting uplink transmission 'b', the UE 101 may need to perform: (1) one directional LBT procedure corresponding to the beam 'A' before transmitting the uplink transmission 'a'; and (2) another directional LBT procedure corresponding to the beam 'B' before transmitting the uplink transmission 'b'. However, the earlier-indicated beam for the corresponding uplink transmission (e.g., the beam 'A' for the uplink transmission 'a') may not be updated timely as the rapidly changing channel condition and may not be appropriate anymore for transmitting the corresponding uplink transmission.

Accordingly, in the present disclosure, aligning beam for transmitting uplink transmissions may be introduced to solve the mentioned issues. In particular, the UE 101 may receive a plurality of control information from the BS 102. Each of the control information may correspond to one uplink transmission and may indicate to the UE 101 a beam for transmitting the corresponding uplink transmission. Then, the UE 101 may determine one beam, which is indicated in one of the control information, for transmitting the upcoming uplink transmissions. In other words, the UE 101 may determine the beam, which is indicated in the latest control information, for transmitting the upcoming uplink transmissions. More details on embodiments of the present disclosure will be further described hereinafter.

In some embodiments, when the UE 101 is going to initiate a new channel occupancy, which means that the UE 101 may perform LBT-Cat. 4 to access the channel, a beam for upcoming uplink transmission(s) may be the one most recently indicated.

Figure 2:
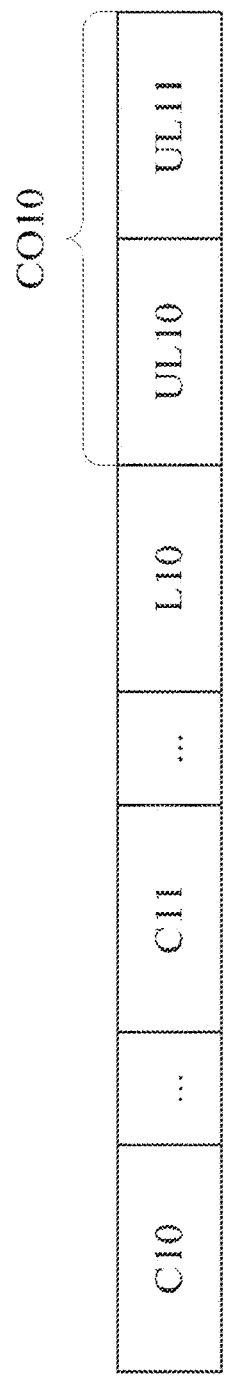
FIG. 2 illustrates a schematic diagram of uplink transmissions in accordance with some embodiments of the present application.

Please refer to FIG. 2, which is a schematic diagram of uplink transmissions in accordance with some embodiments of the present application. In some implementations, the UE 101 may receive a control information C10 corresponding to an uplink transmission UL10. The control information C10 may indicate to the UE 101 a beam 'A10' for transmitting the corresponding uplink transmission UL10. Next, the UE 101 may receive a control information C11 corresponding to an uplink transmission UL11. The control information C11 may indicate to the UE 101 a beam 'A11' for transmitting the corresponding uplink transmission UL11. Then, the UE 101 may perform an LBT procedure L10 and initiate a channel occupancy CO10.

In these implementations, regarding the upcoming uplink transmission UL10, because the UE 101 may perform the LBT procedure L10 and initiate the channel occupancy CO10 (i.e., the UE 101 is going to initiate a new channel occupancy), a beam for the upcoming uplink transmission UL10 may be determined as one that is the most recently indicated, which is the beam 'A11'.

More specifically, the most recently received control information may be the control information C11 so that the beam 'A11' indicated in the control information C11 may be the most recently indicated beam. Therefore, the UE 101 may determine the beam 'A11' for transmitting the upcoming uplink transmission UL10. Accordingly, the UE 101 may transmit the uplink transmission UL10 by the beam 'A11'.

In some embodiments, when the UE 101 is going to utilize a current channel occupancy, which means that the UE 101 may perform LBT-Cat. 2 procedure or may not need to perform LBT procedure to access the channel, a beam for upcoming uplink transmission(s) may be the one corresponding to uplink transmission for initiating the channel occupancy.

Figure 3:
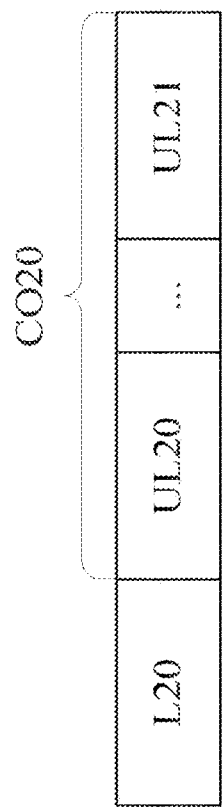
FIG. 3 illustrates a schematic diagram of uplink transmissions in accordance with some embodiments of the present application.

Please refer to FIG. 3, which is a schematic diagram of uplink transmissions in accordance with some embodiments of the present application. In some implementations, the UE 101 may perform an LBT procedure L20 and initiate a channel occupancy CO20, and a beam for an uplink transmission UL20 may be determined as a beam 'A20'.

In these implementations, regarding an uplink transmission UL21, because the UE 101 is going to utilize the channel occupancy CO20 (i.e., the UE 101 is going to utilize the current channel occupancy), a beam for the uplink transmission UL21 may be determined as one corresponding to the uplink transmission UL20 that initiates the channel occupancy CO20, which is the beam 'A20'.

More specifically, the uplink transmission for initiating the channel occupancy CO20 may be the uplink transmission UL20 and the beam 'A20' may be used for transmitting the uplink transmission UL20. Therefore, the UE 101 may determine the beam 'A20' for transmitting the upcoming uplink transmission UL21. Accordingly, the UE 101 may transmit the uplink transmissions UL20 and UL21 by the beam 'A20'.

In some embodiments, when the UE 101 is going to utilize a current channel occupancy, which means that the UE 101 may perform LBT-Cat. 2 procedure or may not need to perform LBT procedure to access the channel, a beam for upcoming uplink transmission(s) may be the one corresponding to uplink transmission for initiating the channel occupancy. Further, when the UE 101 is going to initiate a new channel occupancy, which means that the UE 101 may perform LBT-Cat. 4 to access the channel, a beam for upcoming uplink transmission(s) may be the one most recently indicated.

Figure 4:
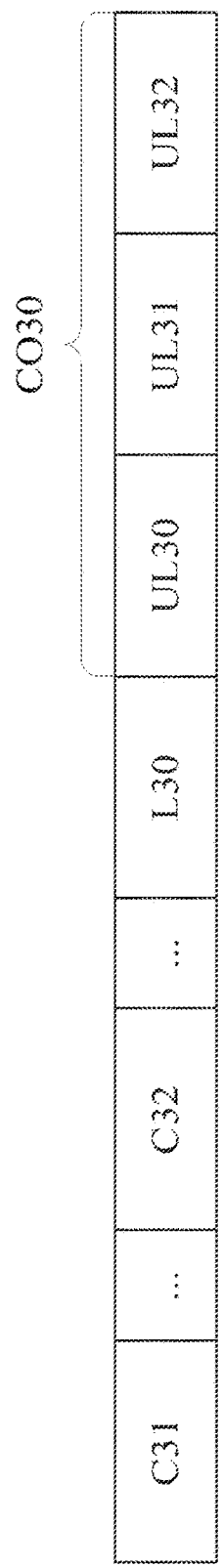
FIG. 4 illustrates a schematic diagram of uplink transmissions in accordance with some embodiments of the present application.

Please refer to FIG. 4, which is a schematic diagram of uplink transmissions in accordance with some embodiments of the present application. In some implementations, the UE 101 may be indicated an earlier-indicated beam 'A30' for transmitting an uplink transmission UL30. The beam 'A30' may be indicated in an earlier-received control information (not shown) corresponding to the uplink transmission UL30. Next, the UE 101 may receive a control information C31 corresponding to an uplink transmission UL31. The UE 101 may receive a control information C32 corresponding to an uplink transmission UL32. Then, the UE 101 may perform an LBT procedure L30 and initiate a channel occupancy CO30.

In these implementations, regarding the uplink upcoming transmission UL30, because the UE 101 may perform the LBT procedure L30 and initiate the channel occupancy CO30 (i.e., the UE 101 is going to initiate a new channel occupancy), a beam for the upcoming uplink transmission UL30 may be determined as one that is most recently indicated, which is the beam 'A32'.

More specifically, the most recently received control information may be the control information C32 so that the beam 'A32' indicated in the control information C32 may be the most recently indicated beam. Therefore, the UE 101 may determine the beam 'A32' for transmitting the upcoming uplink transmission UL30.

In these implementations, regarding the uplink transmissions UL31 and UL32, because the UE 101 is going to utilize the channel occupancy CO30 (i.e., the UE 101 is going to utilize the current channel occupancy), a beam for the uplink transmissions UL31 and UL32 may be determined as one corresponding to the uplink transmission UL30 that initiates the channel occupancy CO30.

More specifically, the uplink transmission for initiating the channel occupancy CO30 may be the uplink transmission UL30 and the beam 'A32' may be used for transmitting the uplink transmission UL30. Therefore, the UE 101 may determine the beam 'A32' for transmitting the uplink transmissions UL31 and UL32. Accordingly, the UE 101 may transmit the uplink transmissions UL30, UL31 and UL32 by the beam 'A32'.

In some embodiments, when the UE 101 receives a control information within a Maximum Channel Occupancy Time (MCOT) of a current channel occupancy, the UE may perform LBT-Cat. 4 procedure to initiate a new channel occupancy. A beam for upcoming uplink transmission(s) may be changed to the one most recently indicated.

Figure 5:
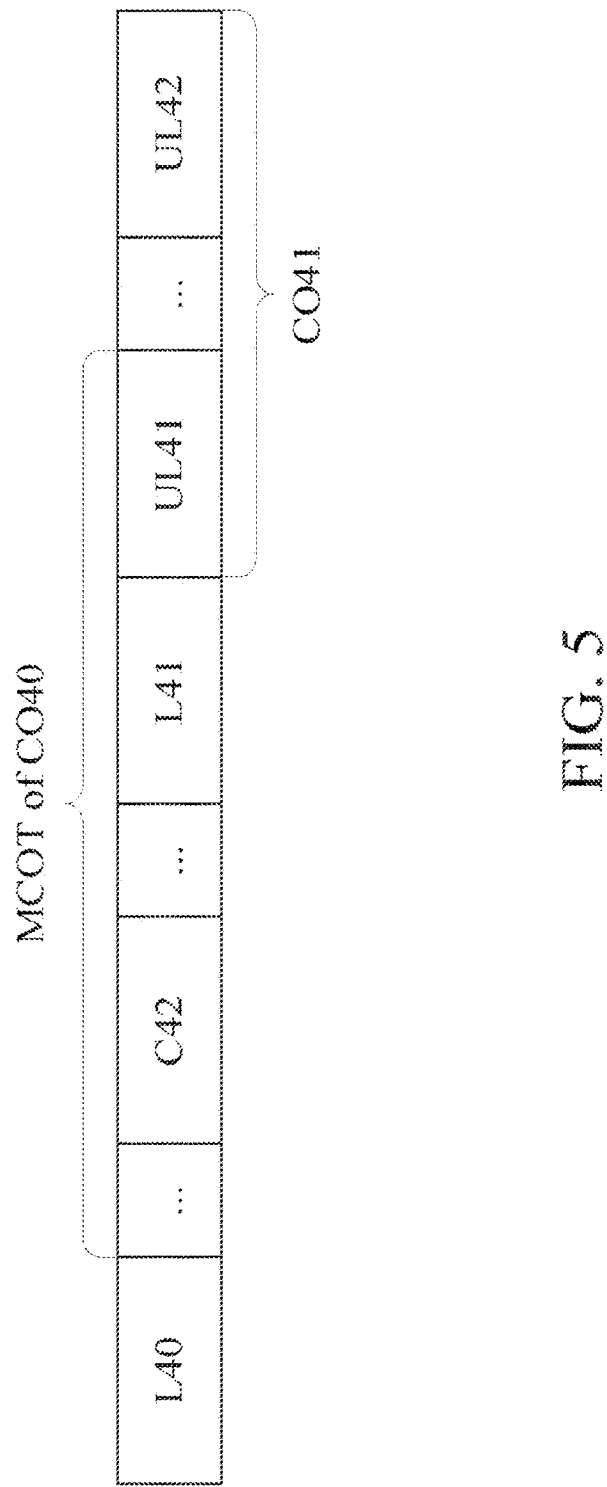
FIG. 5 illustrates a schematic diagram of uplink transmissions in accordance with some embodiments of the present application.

Please refer to FIG. 5, which is a schematic diagram of uplink transmissions in accordance with some embodiments of the present application. In some implementations, the UE 101 may perform an LBT procedure L40 and initiate a channel occupancy CO40 with a MCOT. Within the MCOT of the CO40, the UE 101 may receive a control information C42. The control information C42 may correspond to an uplink transmission UL42, and the control information C42 may indicate to the UE 101 a beam 'A42' for transmitting the uplink transmission UL42. Before receiving the control information C42, the UE 101 may be indicated an earlier-indicated beam 'A41' for transmitting an uplink transmission UL41. The beam 'A41' may be indicated in an earlier-received control information (not shown) corresponding to the uplink transmission UL41.

After receiving the control information C42, the UE 101 may perform an LBT procedure L41 and initiate a channel occupancy CO41 (i.e., the UE 101 is going to initiate a new channel occupancy), a beam for the upcoming uplink transmission UL41 may be determined as one that is the most recently indicated, which is the beam 'A42'.

More specifically, the most recently received control information may be the control information C42 so that the beam 'A42' indicated in the control information C42 may be the most recently indicated beam. Therefore, the UE 101 may determine the beam 'A42' for transmitting the upcoming uplink transmission UL41. Accordingly, the UE 101 may transmit the uplink transmission UL41 by the beam 'A42'.

In some embodiments, when the UE 101 receives a control information within a MCOT of a current channel occupancy, the UE may perform LBT-Cat. 4 procedure and initiate a new channel occupancy. A beam for upcoming uplink transmission(s) may be changed to the one most recently indicated.

Figure 6:
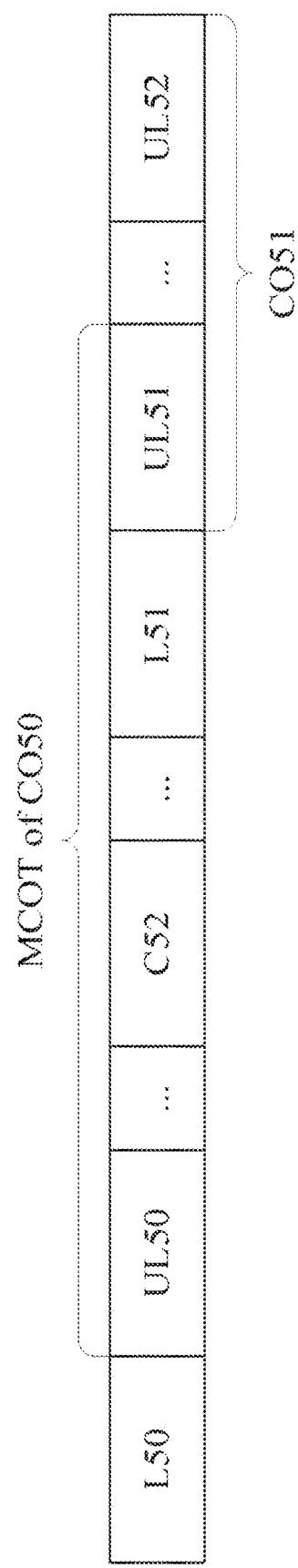
FIG. 6 illustrates a schematic diagram of uplink transmissions in accordance with some embodiments of the present application.

Please refer to FIG. 6, which is a schematic diagram of uplink transmissions in accordance with some embodiments of the present application. In some implementations, the UE 101 may perform an LBT procedure L50 and initiate a channel occupancy CO50 with a MCOT. A beam for an uplink transmission UL50 may be determined as a beam 'A50'.

Then, within the MCOT of the CO50, the UE 101 may receive a control information C52 after transmitting the uplink transmission UL50. The control information C52 may correspond to an uplink transmission UL52, and the control information C52 may indicate to the UE 101 a beam 'A52' for transmitting the uplink transmission UL52. Before receiving the control information C52, the UE 101 may be indicated an earlier-indicated beam 'A51' for transmitting an uplink transmission UL51. The beam 'A41' may be indicated in an earlier-received control information (not shown) corresponding to the uplink transmission UL51.

After receiving the control information C52, the UE 101 may perform an LBT procedure L51 and initiate a channel occupancy CO51 (i.e., the UE 101 is going to initiate a new channel occupancy), a beam for the upcoming uplink transmission UL51 may be determined as one that is most recently indicated, which is the beam 'A52'.

More specifically, the most recently received control information may be the control information C52 so that the beam 'A52' indicated in the control information C52 may be the most recently indicated beam. Therefore, the UE 101 may determine the beam 'A52' for transmitting the upcoming uplink transmission UL51. Accordingly, the UE 101 may transmit the uplink transmissions UL50 by the beam 'A50' and may transmit the uplink transmissions UL51 by the beam 'A52'.

In some embodiments, when the UE 101 is going to initiate a new channel occupancy to access channel (which means that the UE 101 may perform LBT-Cat. 4 to access the channel) or the UE 101 is going to utilize a current channel occupancy to access channel (which means that the UE 101 may perform LBT-Cat. 2 procedure or may not need to perform LBT procedure to access the channel), a beam for upcoming uplink transmission(s) may not be changed according to some schedules of reference signals.

Figure 7:
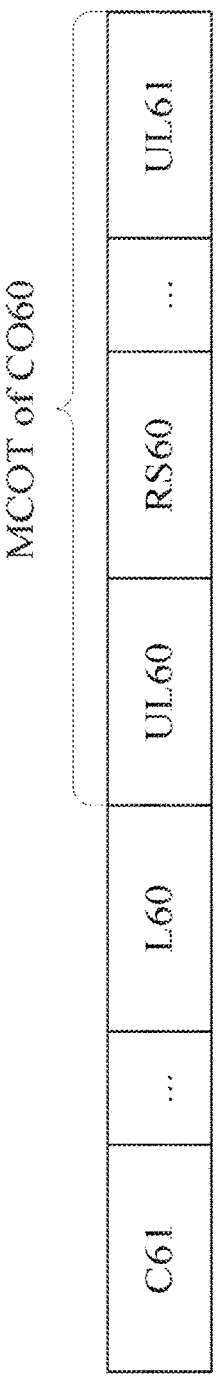
FIG. 7 illustrates a schematic diagram of uplink transmissions in accordance with some embodiments of the present application.

Please refer to FIG. 7, which is a schematic diagram of uplink transmissions in accordance with some embodiments of the present application. In some implementations, the UE 101 may receive a control information C61 from the BS 102. The control information C61 may correspond to an uplink transmission UL61, and the control information C61 may indicate to the UE 101 a beam 'A61' for transmitting the uplink transmission UL61. Then, the UE 101 may perform an LBT procedure L60 and initiate a channel occupancy CO60 with a MCOT.

In these implementations, regarding an upcoming uplink transmission UL60, the UE 101 may determine whether any reference signal is subsequent to the uplink transmission UL60. As shown in FIG. 7, when a reference signal RS60 is subsequent to the uplink transmission UL60, there is not enough gap between the uplink transmission UL60 and the reference signal RS60 for new LBT procedure. Therefore, changing the beam for transmitting the uplink transmission UL60 may lead to that the UE 101 cannot transmit the reference signal RS60. Accordingly, the UE 101 may transmit the uplink transmission UL60 and the reference signal RS60 by an earlier-indicated beam 'A60' indicated in a control information, which may be received before the control information C61, corresponding to the uplink transmission UL60.

On the other hand, when there is no reference signal is subsequent to the uplink transmission UL60, the UE 101 may transmit the uplink transmission UL60 by the beam 'A61' indicated in the most recently received control information C61.

In some embodiments, when the UE 101 is going to initiate a new channel occupancy to access channel (which means that the UE 101 may perform LBT-Cat. 4 to access the channel) or the UE 101 is going to utilize a current channel occupancy to access channel (which means that the UE 101 may perform LBT-Cat. 2 procedure or may not need to perform LBT procedure to access the channel), a beam for upcoming uplink transmission(s) may not be changed according to some schedules of uplink transmissions.

Particularly, the BS 102 may schedule multiple uplink transmissions from multiple UEs by the same beam simultaneously. Therefore, changing the beam of some UEs may lead to that the BS 102 cannot receive all the uplink transmissions. Accordingly, an indicator of beam switching information may be introduced in the control information, and the indicator may indicate the UE 101 not to change the beam for transmitting the corresponding uplink transmission.

Figure 8:
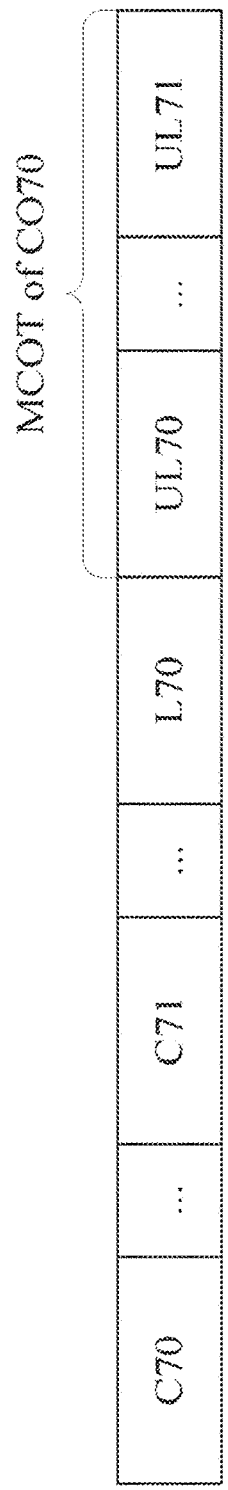
FIG. 8 illustrates a schematic diagram of uplink transmissions in accordance with some embodiments of the present application.

Please refer to FIG. 8, which is a schematic diagram of uplink transmissions in accordance with some embodiments of the present application. In some implementations, the UE 101 may receive a control information C70 and a control information C71 from the BS 102. The control information C70 may correspond to an uplink transmission UL70, and the control information C70 may indicate to the UE 101 a beam 'A70' for transmitting the uplink transmission UL70. The control information C71 may correspond to an uplink transmission UL71, and the control information C71 may indicate to the UE 101 a beam 'A71' for transmitting the uplink transmission UL71. Then, the UE 101 may perform an LBT procedure L70 and initiate a channel occupancy CO70 with a MCOT.

In these implementations, regarding the uplink transmission UL70, the UE 101 may determine whether the corresponding control information C70 includes an indicator of beam switching information indicating the UE 101 not to change beam. When the control information C70 includes the indicator of beam switching information indicating the UE 101 not to change beam, the UE 101 may transmit the uplink transmission UL70 by the beam 'A70' indicated in the control information C70. When there is no indicator of beam switching information in the control information C70 or the control information C70 may include an indicator of beam switching information indicating the UE 101 of being allowed to change beam, the UE 101 may transmit the uplink transmission UL70 by the beam 'A71' indicated in the most recently received control information C71.

Figure 9:
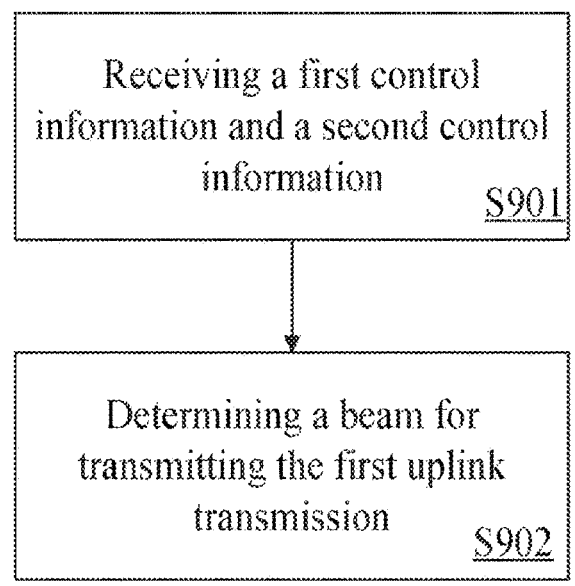
FIG. 9 illustrates a flow chart of a method for wireless communications according to an embodiment of the present disclosure.

FIG. 9 illustrates a flow chart of a method for wireless communications in accordance with some embodiments of the present application. Referring to FIG. 9, method 900 is performed by a UE (e.g., the UE 101) in some embodiments of the present application.

In some embodiments, operation 5901 is executed to receive, by the UE, a first control information for a first uplink transmission and a second control information for a second uplink transmission. Operation 5902 is executed to determine, by the UE, a beam for transmitting the first uplink transmission. The beam may be indicated in the first control information or indicated in the second control information.

Figure 10:
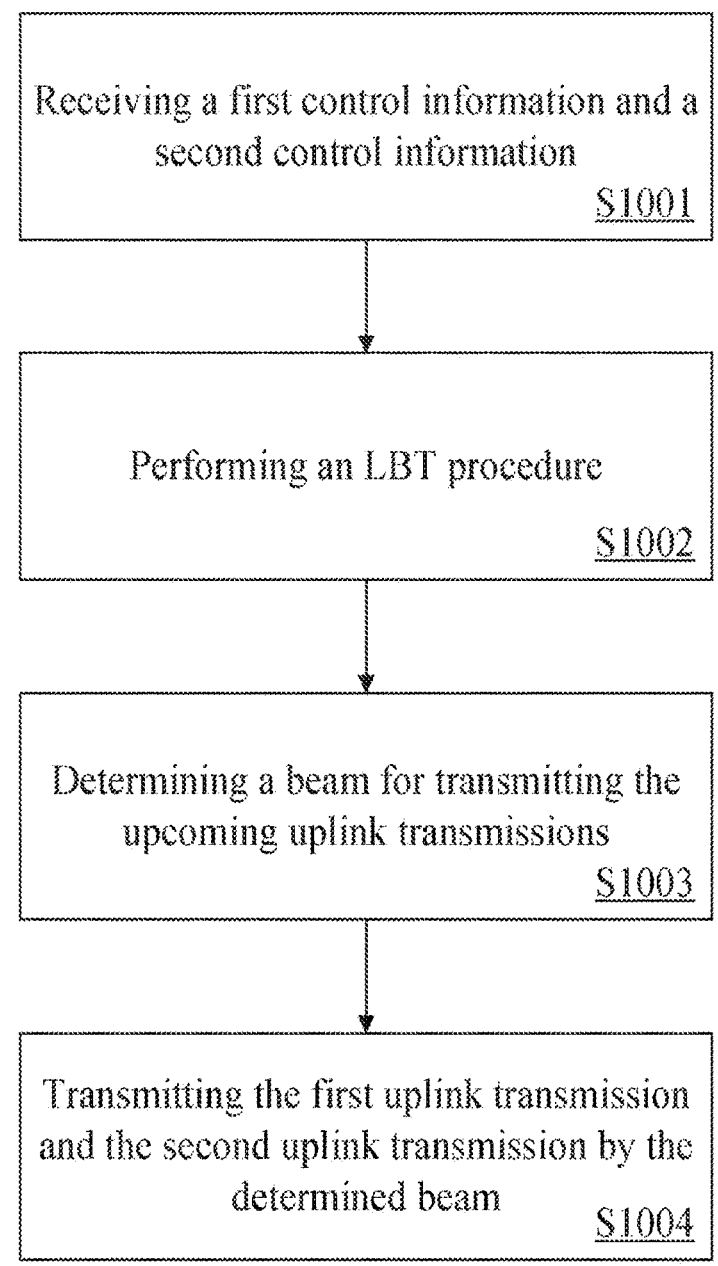
FIG. 10 illustrates a flow chart of a method for wireless communications according to an embodiment of the present disclosure.

FIG. 10 illustrates a flow chart of a method for wireless communications in accordance with some embodiments of the present application. Referring to FIG. method 1000 is performed by a UE (e.g., the UE 101) in some embodiments of the present application.

In some embodiments, operation S1001 is executed to receive, by the UE, a first control information for a first uplink transmission and a second control information for a second uplink transmission. Operation S1002 is executed to perform, by the UE, an LBT procedure. Operation S1003 is executed to determine, by the UE, a beam for transmitting upcoming uplink transmissions which include the first uplink transmission and the second uplink transmission. Operation S1004 is executed to transmit, by the UE, the first uplink transmission and the second uplink transmission by the determined beam.

In some implementations, the second control information may be the most recently received control information (i.e., the latest received control information). Accordingly, the beam indicated in the second control information may be the the one most recently indicated. Therefore, the first uplink transmission and the second uplink transmission may be transmitted by the beam indicated in the second control information.

In some implementations, the first control information may be the most recently received control information (i.e., the latest received control information). Accordingly, the beam indicated in the first control information may be the the one most recently indicated. Therefore, the first uplink transmission and the second uplink transmission may be transmitted by the beam indicated in the first control information.

Figure 11:
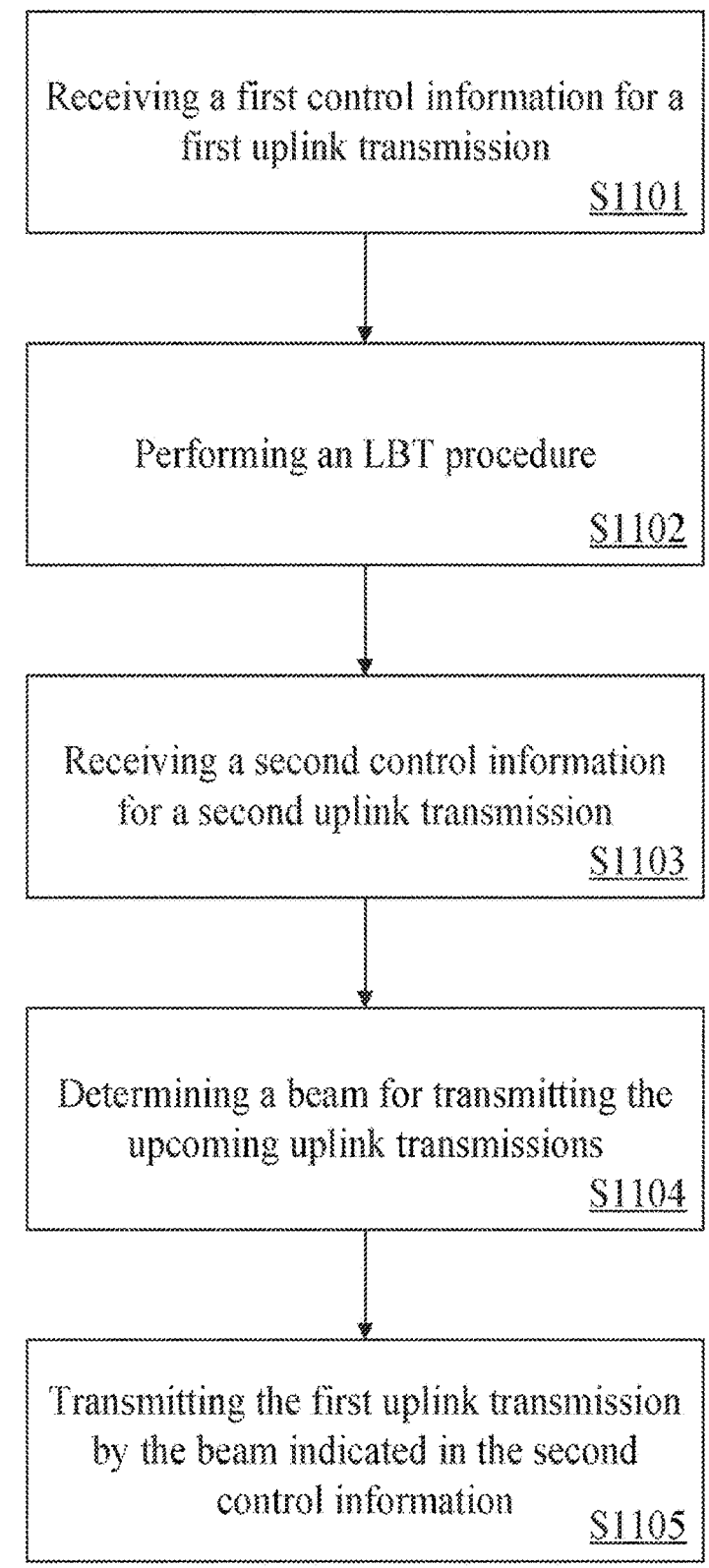
FIG. 11 illustrates a flow chart of a method for wireless communications according to an embodiment of the present disclosure.

FIG. 11 illustrates a flow chart of a method for wireless communications in accordance with some embodiments of the present application. Referring to FIG. 11, method 1100 is performed by a UE (e.g., the UE 101) in some embodiments of the present application.

In some embodiments, operation S1101 is executed to receive, by the UE, a first control information for a first uplink transmission. Operation S1102 is executed to perform, by the UE, an LBT procedure. Operation S1103 is executed to received, by the UE, a second control information for a second uplink transmission. Operation S1104 is executed to determine, by the UE, a beam for transmitting upcoming uplink transmission which includes the first uplink transmission at least. The beam may be indicated in the second control information which may be the latest received control information. Operation S1105 is executed to transmit, by the UE, the first uplink transmission by the beam indicated in the second control information. In some embodiments, the UE may transmit another uplink transmission by another beam before receiving the second control information.

Figure 12:
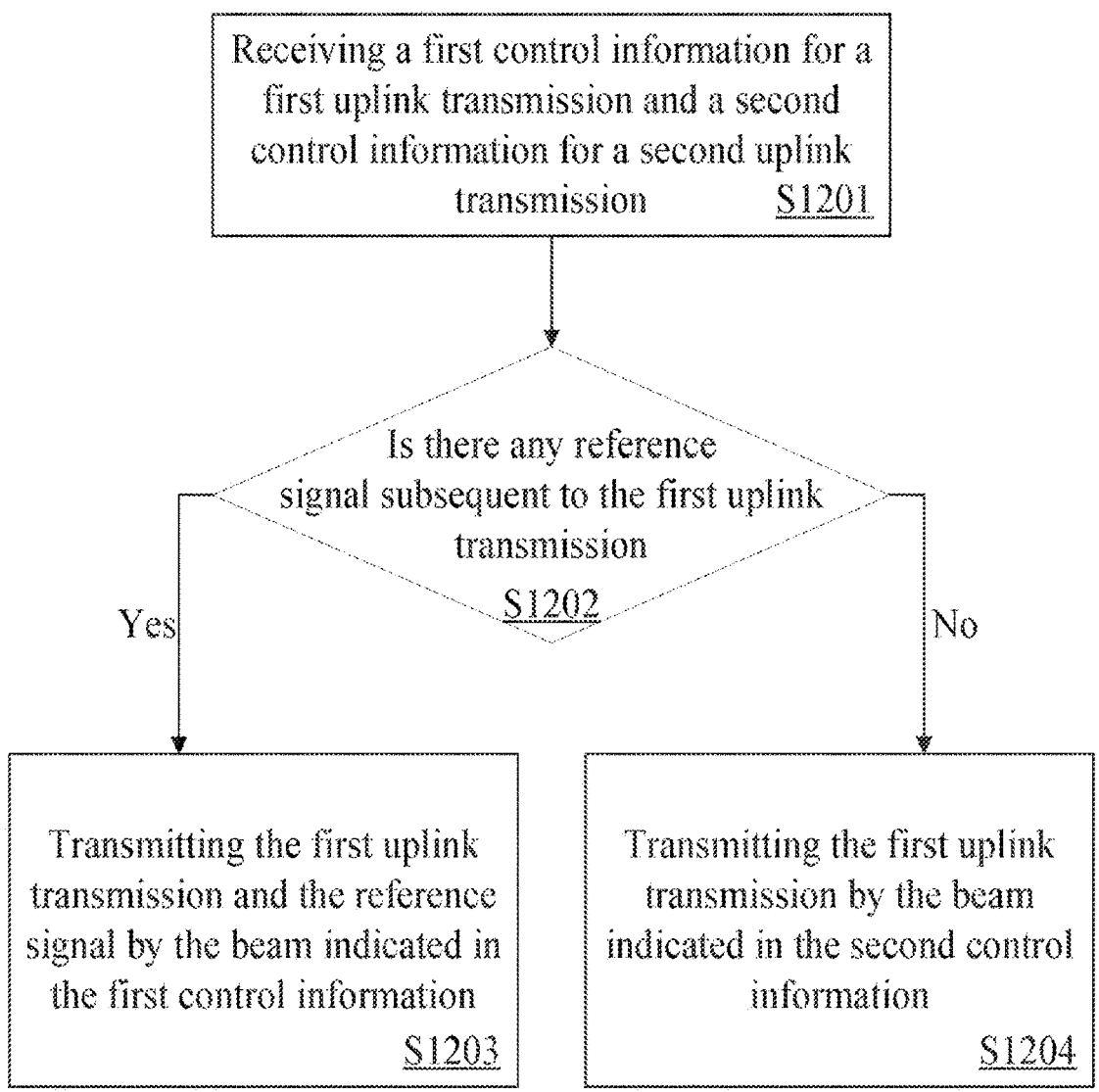
FIG. 12 illustrates a flow chart of a method for wireless communications according to an embodiment of the present disclosure.

FIG. 12 illustrates a flow chart of a method for wireless communications in accordance with some embodiments of the present application. Referring to FIG. 12, method 1200 is performed by a UE (e.g., the UE 101) in some embodiments of the present application.

In some embodiments, operation S1201 is executed to receive, by the UE, a first control information for a first uplink transmission and a second control information for a second uplink transmission. The first uplink transmission may be scheduled to be transmitted before the second uplink transmission. Operation S1202 is executed to determine, by the UE, whether any reference signal is subsequent to the first uplink transmission.

When a reference signal corresponding to the first uplink transmission is subsequent to the first uplink transmission, operation S1203 is executed to transmit, by the UE, the first uplink transmission and the reference signal by a beam indicated in the first control information corresponding to the first uplink transmission. When there is no reference signal is subsequent to the first uplink transmission, operation S1204 is executed to transmit, the first uplink transmission by a beam indicated in the second control information, which may be the most recently received control information.

Figure 13:
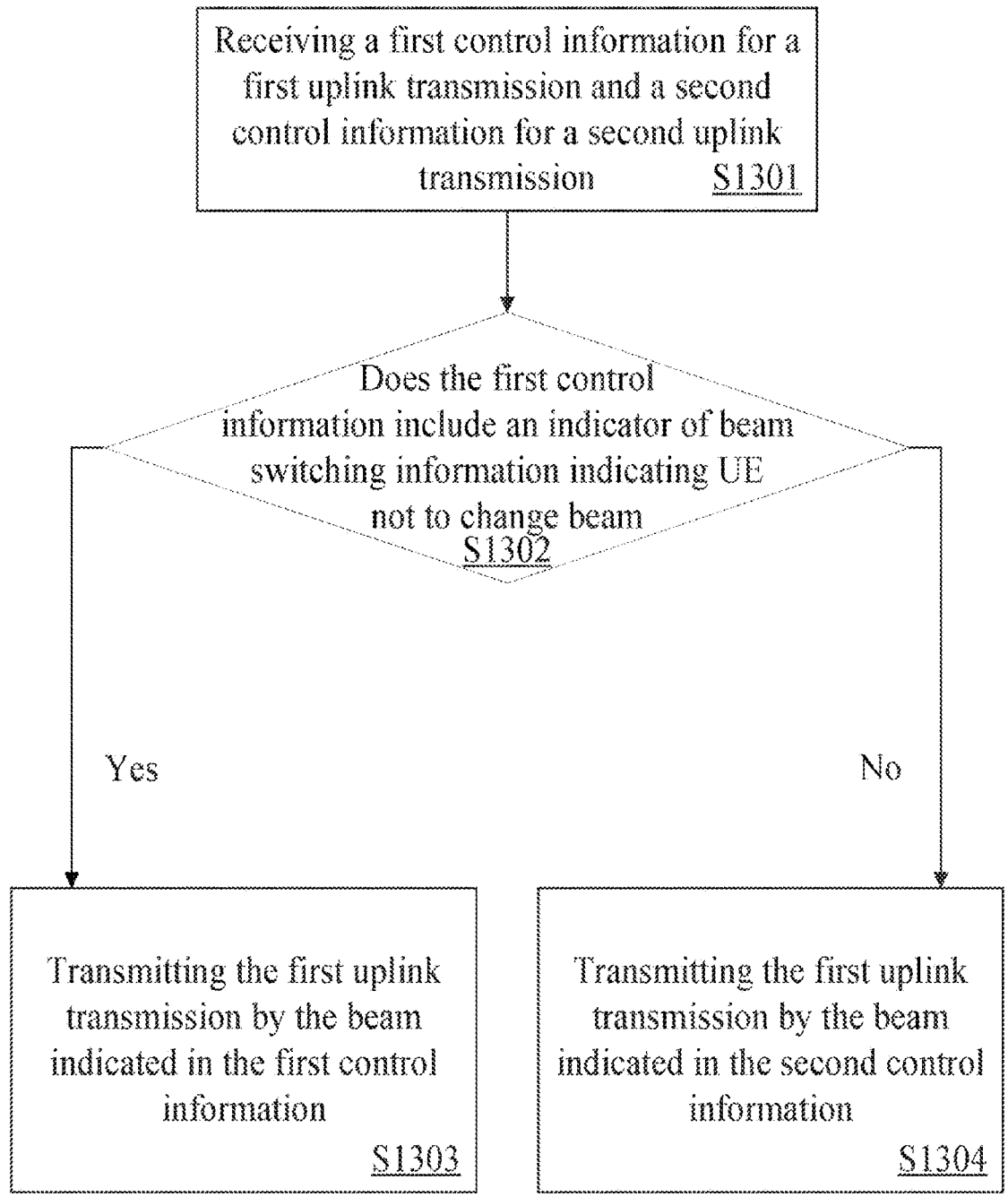
FIG. 13 illustrates a flow chart of a method for wireless communications according to an embodiment of the present disclosure.

FIG. 13 illustrates a flow chart of a method for wireless communications in accordance with some embodiments of the present application. Referring to FIG. 13, method 1300 is performed by a UE (e.g., the UE 101) in some embodiments of the present application.

In some embodiments, operation 51301 is executed to receive, by the UE, a first control information for a first uplink transmission and a second control information for a second uplink transmission. The first uplink transmission may be scheduled to be transmitted before the second uplink transmission. Operation 51302 is executed to determine, by the UE, whether the first control information includes an indicator of beam switching information indicating the UE 101 not to change beam. The indicator may indicate the UE not to change the beam for transmitting the corresponding uplink transmission.

When the first control information includes an indicator of beam switching information indicating the UE 101 not to change beam, operation 51303 is executed to transmit, by the UE, the first uplink transmission by a beam indicated in the first control information corresponding to the first uplink transmission. When the first control information does not include the indicator of beam switching information or the control information C70 may include an indicator of beam switching information indicating the UE 101 of being allowed to change beam, operation 51305 is executed to transmit, the first uplink transmission by a beam indicated in the second control information, which may be the most recently received control information.

It should be noted that the uplink transmissions mentioned above may include Physical Uplink Shared Channel (PUSCH) transmission, Configured Grant PUSCH (CG-PUSCH) transmission, Physical Uplink Control Channel (PUCCH) transmission or Physical Random Access Channel (PRACH) transmission. The control information mentioned above may be downlink control information (DCI) related to PUSCH transmission, CG-PUSCH transmission or PUCCH transmission. The control information mentioned above may be higher layer signaling (e.g., RRC signaling) related to CG-PUSCH transmission, PUCCH transmission or PRACH transmission. The reference signals mentioned above may be Sounding Reference Signal (SRS). The LBT procedures mentioned above may include directional LBT procedure.

It should be noted that the control information mentioned may be any control information for scheduling uplink transmissions. However, it is not intended to limit the type of the control information for scheduling uplink transmissions. It is also not intended to limit the type of reference signal.

Figure 14:
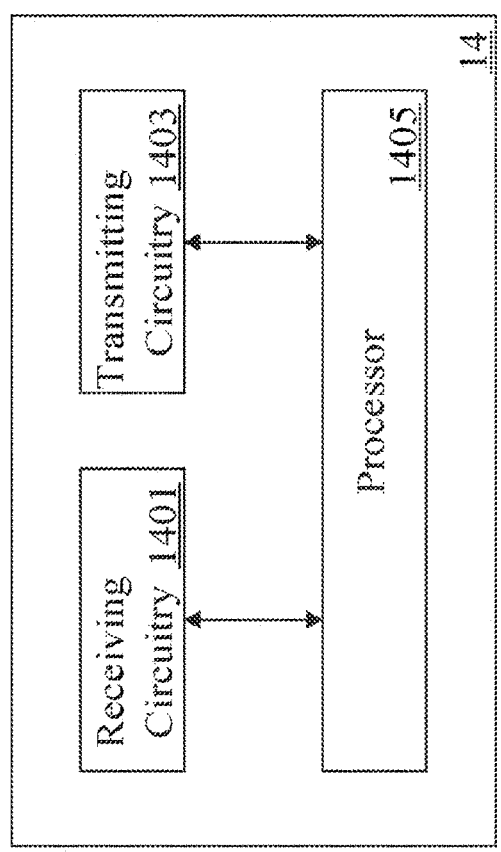
FIG. 14 illustrates a block diagram of an exemplary apparatus in accordance with some embodiments of the present application.

FIG. 14 illustrates an example block diagram of an apparatus 14 according to an embodiment of the present disclosure.

As shown in FIG. 14, the apparatus 14 may include at least one non-transitory computer-readable medium (not illustrated in FIG. 14), a receiving circuitry 1401, a transmitting circuitry 1403, and a processor 1405 coupled to the non-transitory computer-readable medium (not illustrated in FIG. 14), the receiving circuitry 1401 and the transmitting circuitry 1403. The apparatus 14 may be an UE.

Although in this figure, elements such as processor 1405, transmitting circuitry 1403, and receiving circuitry 1401 are described in the singular, the plural is contemplated unless limitation to the singular is explicitly stated. In some embodiments of the present disclosure, the receiving circuitry 1401 and the transmitting circuitry 1403 are combined into a single device, such as a transceiver. In certain embodiments of the present disclosure, the apparatus 14 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 14 interacting with receiving circuitry 1401 and transmitting circuitry 1403, so as to perform the operations with respect to UE depicted in FIG. 1.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A user equipment (UE) for wireless communication, comprising:
    at least one memory; and
    at least one processor coupled with the at least one memory and operable to cause the UE to:
        receive, before performing a directional listen-before-talk (LBT) procedure, a first control information for a first uplink transmission and a second control information for a second uplink transmission;
        perform the directional LBT procedure;
        transmit the first uplink transmission by a beam indicated in the second control information; and
        transmit the second uplink transmission by the beam indicated in the second control information.

2. The UE of claim 1, wherein the directional LBT procedure corresponds to the beam indicated in the second control information.

3. The UE of claim 1, wherein the first control information and the second control information comprise downlink control information (DCI).

4. The UE of claim 1, wherein the first control information and the second control information comprise a higher layer signaling.

5. A user equipment (UE) for wireless communication, comprising:
    at least one memory; and
    at least one processor coupled with the at least one memory and operable to cause the UE to:
        receive, before performing a first directional listen-before-talk (LBT) procedure, a first control information for a first uplink transmission;
        perform the first directional LBT procedure;
        receive, after performing the first directional LBT procedure, a second control information for a second uplink transmission;
        perform a second directional LBT procedure; and
        transmit the first uplink transmission by a beam indicated in the second control information.

6. The UE of claim 5, wherein the at least one processor is further operable to cause the UE to transmit a third uplink transmission by an additional beam before receiving the second control information.

7. The UE of claim 5, wherein the first control information and the second control information comprise downlink control information (DCI).

8. The UE of claim 5, wherein the first control information and the second control information comprise a higher layer signaling.

9. A base station (BS) for wireless communication, comprising:
- at least one memory; and
- at least one processor coupled with the at least one memory and operable to cause the BS to:
  - transmit a first control information for a first uplink transmission and a second control information for a second uplink transmission;
  - receive, based at least in part on a directional listen-before-talk (LBT) procedure, the first uplink transmission by a beam indicated in the second control information; and
  - receive the second uplink transmission by the beam indicated in the second control information.

10. The BS of claim 9, wherein the directional LBT procedure corresponds to the beam indicated in the second control information.

11. The BS of claim 9, wherein the at least one processor is further operable to cause the BS to receive a third uplink transmission by an additional beam before transmitting the second control information.

12. The BS of claim 9, wherein the first control information and the second control information comprise downlink control information (DCI).

13. The BS of claim 9, wherein the first control information and the second control information comprise a higher layer signaling.

14. A base station (BS) for wireless communication, comprising:
- at least one memory; and
- at least one processor coupled with the at least one memory and operable to cause the BS to:
  - transmit a first control information for a first uplink transmission;
  - transmit, based at least in part on a first directional listen-before-talk (LBT) procedure, a second control information for a second uplink transmission; and
  - receive, based at least in part on a second directional LBT procedure, the first uplink transmission by a beam indicated in the second control information.

15. The BS of claim 14, wherein the first control information and the second control information comprise downlink control information (DCI).

16. The BS of claim 14, wherein the first control information and the second control information comprise a higher layer signaling.

* * * * *